(12) United States Patent
Maddigan

(10) Patent No.: US 9,367,107 B2
(45) Date of Patent: Jun. 14, 2016

(54) METHOD AND SYSTEM FOR CONTROLLING RESET STATE CHANGE IN A SYSTEM-ON-A-CHIP DEVICE

(75) Inventor: Steven William Maddigan, Mississauga (CA)

(73) Assignee: PSION INC., Mississauga, Ontario (CA)

( * ) Notice: Subject to any disclaimer, the term of this patent is extended or adjusted under 35 U.S.C. 154(b) by 241 days.

(21) Appl. No.: 13/276,596

(22) Filed: Oct. 19, 2011

(65) Prior Publication Data

US 2013/0103935 A1 Apr. 25, 2013

(51) Int. Cl.
*G06F 1/24* (2006.01)
*G06F 1/32* (2006.01)
*G06F 9/44* (2006.01)

(52) U.S. Cl.
CPC .............. *G06F 1/24* (2013.01); *G06F 1/3206* (2013.01); *G06F 9/4401* (2013.01)

(58) Field of Classification Search
CPC ....................................................... G06F 1/24
USPC .................................................. 713/2, 323
See application file for complete search history.

(56) References Cited

U.S. PATENT DOCUMENTS

| | | | | |
|---|---|---|---|---|
| 3,716,850 | A * | 2/1973 | Fisher et al. ................. | 341/24 |
| 5,410,706 | A * | 4/1995 | Farrand et al. ................ | 713/2 |
| 5,860,125 | A * | 1/1999 | Reents ........................ | 713/320 |
| 5,878,264 | A * | 3/1999 | Ebrahim ..................... | 713/323 |
| 6,009,496 | A * | 12/1999 | Tsai ........................... | 711/103 |
| 6,571,347 | B1 * | 5/2003 | Tseng ......................... | 714/6.1 |
| 6,965,989 | B1 * | 11/2005 | Strange et al. ............... | 713/1 |
| 2005/0228980 | A1 * | 10/2005 | Brokish et al. ............... | 713/2 |
| 2007/0288778 | A1 * | 12/2007 | Zhuang et al. ............... | 713/320 |
| 2008/0301480 | A1 * | 12/2008 | Chang et al. ................. | 713/323 |
| 2009/0259854 | A1 * | 10/2009 | Cox et al. .................... | 713/189 |
| 2010/0070743 | A1 * | 3/2010 | Grigor et al. ................. | 713/1 |
| 2011/0022826 | A1 * | 1/2011 | More et al. .................. | 713/1 |
| 2011/0185162 | A1 * | 7/2011 | Iyer et al. .................... | 713/2 |
| 2012/0102348 | A1 * | 4/2012 | Muralidhar et al. .......... | 713/323 |
| 2012/0265974 | A1 * | 10/2012 | Shen .......................... | 713/1 |
| 2013/0013906 | A1 * | 1/2013 | Brown et al. ................ | 713/2 |

FOREIGN PATENT DOCUMENTS

CN   WO2010148693   * 12/2010   ............ G06F 1/24

OTHER PUBLICATIONS

Shen, Shaowu, Machine translated version of WIPO document 2010148693—Method and Device for Intelligent Terminal Reset, Dec. 29, 2010.*

* cited by examiner

*Primary Examiner* — Thomas Lee
*Assistant Examiner* — Danny Chan

(57) ABSTRACT

A method and system are set forth for enabling software control of a power management unit (PMU) in a System-On-a-Chip (SoC) device to effect changes in power state without having to adjust external board level states. In one embodiment, once the SoC system controller has been booted, it communicates with the PMU over a communication bus and is able to request changes in power states without requiring external trigger events. Complete remote control of power states according to the method and system set forth herein provides flexibility when debugging and testing SoC devices because there is no need to alter external board states. Also, providing programmable changes in reset states as an alternative to full system reset preserves state data so that the system can be restarted efficiently and quickly from known conditions.

15 Claims, 5 Drawing Sheets

METHOD AND SYSTEM FOR CONTROLLING RESET STATE CHANGE IN A SYSTEM-ON-A-CHIP DEVICE

BACKGROUND OF THE INVENTION

1. Field of the Invention

The present invention is directed to System-on-a-Chip (SoC) devices, and more particularly to a method and system for enabling software running on a SoC device to request a change in power state directly, without having to adjust external board level states.

2. Description of the Related Art

The term "system-on-a-chip' or SoC commonly refers to an integrated circuit on which all of the necessary electronic circuits and parts are packaged to create a complete "system" (e.g. a hand-held or vehicle-mounted computer, cell phone, digital camera, etc.). Such circuits normally include a system controller (e.g. a microcontroller or microprocessor), memory, timing sources (e.g. clocks), peripherals and external interfaces to analog and/or digital devices. These components are interconnected by a plurality of busses, such as the High-performance Bus (AHB) and Advanced Peripheral Bus (APB) defined in the Advanced Microcontroller Bus Architecture (AMBA), developed by ARM Ltd.

SoC devices typically include a Power Management Unit (PMU) that controls power functions, such as monitoring power connections and battery charges, controlling power to SoC components, and controlling device booting (e.g. cold start and reset). The PMU is conventionally isolated from software control and responds only to external events, such as hardware resets, voltage monitoring, watchdog events, etc. Consequently, it is not possible for the PMU to control changes in power state (e.g. re-boot the SoC) without an external hardware trigger event that meets predetermined threshold conditions.

SUMMARY OF THE INVENTION

It is an aspect of the present invention to provide a method and system for enabling the PMU to effect changes in power state under software control without having to adjust external board level states. In one embodiment, once the SoC system controller has been booted, it communicates with the PMU over the APB bus and is able to request changes in power states without requiring external trigger events.

Complete remote control of power states according to the method and system set forth herein provides flexibility when debugging and testing SoC devices because there is no need to alter external board states. Also, providing programmable changes in reset states as an alternative to full system reset preserves state data so that the system can be restarted efficiently and quickly from known conditions.

In order to protect against inadvertent software requests for power state changes, the requests from the SoC system controller preferably consist of predetermined values that are written to a specific register within the address space of the PMU such that if any other values are written to the register, the write operations are ignored. To increase protection, a specific sequence of write or write/read accesses may be required before a change of power state request is acted upon.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
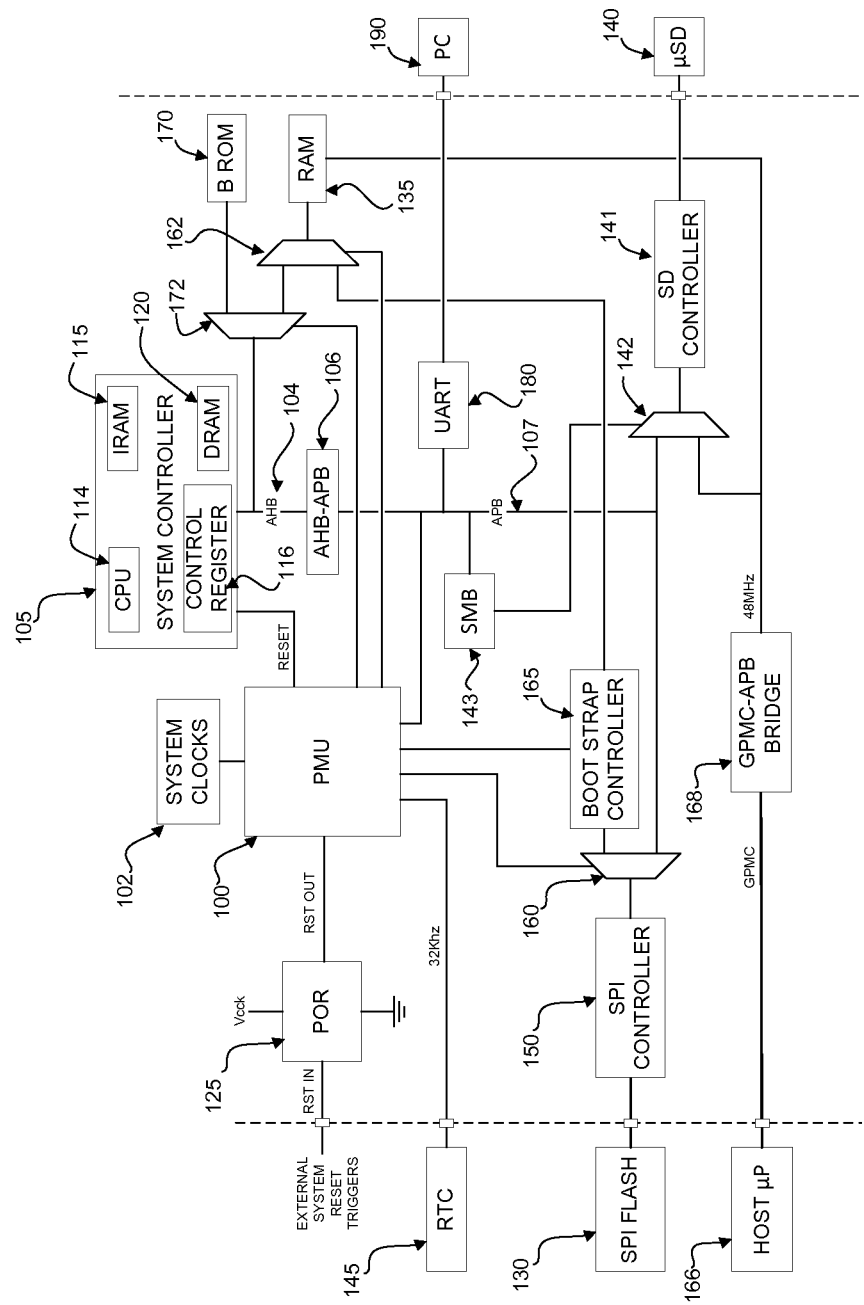
FIG. 1 is a simplified block diagram of a SoC device having a PMU for enabling changes in power state under software control without having to adjust external board level states, according to an embodiment of the present invention.

FIG. 1 is a simplified block diagram of an AMBA-based SoC device implemented on an ASIC (Application Specific Integrated Circuit), according to an embodiment of the present invention. The SoC device includes a PMU 100 for changing power states in response to external trigger events and for controlling system clocks 102, as is known in the art, and also for changing power states under software control of a system controller 105 (e.g. a high performance ARM core processor), as discussed in greater detail below.

The PMU 100, system controller 105, and other SoC components communicate over a pair of busses (a high-performance system backbone bus (AHB 104) and a lower bandwidth bus (APB 107)). The AHB 104 is bridged to the APB 107 via an AHB-APB Bridge 106, which functions as an interface between the AHB and the APB busses, including address, control and data buffering.

The system controller 105 conventionally incorporates a CPU 114, a tightly-coupled IRAM 115 (e.g. 128 Kbytes instruction random access memory (RAM)), a control register 116, and dynamic RAM (DRAM) 120 (e.g. 32 Kbytes data RAM).

As discussed in greater detail below, the PMU 100 comprises a series of state machines for receiving external trigger events from a power-on reset device, POR 125 (e.g. resulting from a cold-start power on, system reset or from a watchdog timer), and in response booting the system controller 105. The booting of system controller 105 begins with an initial load of boot code from an SPI flash (serial peripheral interface) memory 130 into a RAM 135 that is sufficient for the system controller 105 to download the remainder of system code from an external main storage micro secure digital (µSD) memory 140 (e.g. 512 MB-8 GB unified flash memory) via a multiplexer 142 under control of a system management block 143.

The initial boot code is read from SPI flash memory 130 by an SPI controller 150, through a set of multiplexers 160 and 162 and is written to RAM 135 via a boot strap controller 165. More particularly, the boot code loaded into RAM 135 from the SPI flash memory 130 allows the system controller 105 to communicate with a host processor 166 over a GPMC-APB bridge 168 (General Purpose Memory Controller-to Advanced Peripheral Bus), under control of a system management block (SMB) 143.

As discussed in greater detail below, if the boot strap operation fails (e.g. the SPI flash memory 130 is empty), the PMU 100 instead selects a boot read only memory (ROM) 170 via multiplexer 172, which contains sufficient boot code for the system controller 105 to communicate with a UART 180 (Universal Asynchronous Receiver Transmitter) to receive boot code for loading the SPI flash memory 130.

The AHB-APB bridge 106 translates AHB transactions from the System Controller 105 to the APB peripherals including the PMU 100, SMB 143, UART 180, SPI Controller 150 (via multiplexer 160) and SD Controller 141 (via multiplexer 142).

Figure 2A:
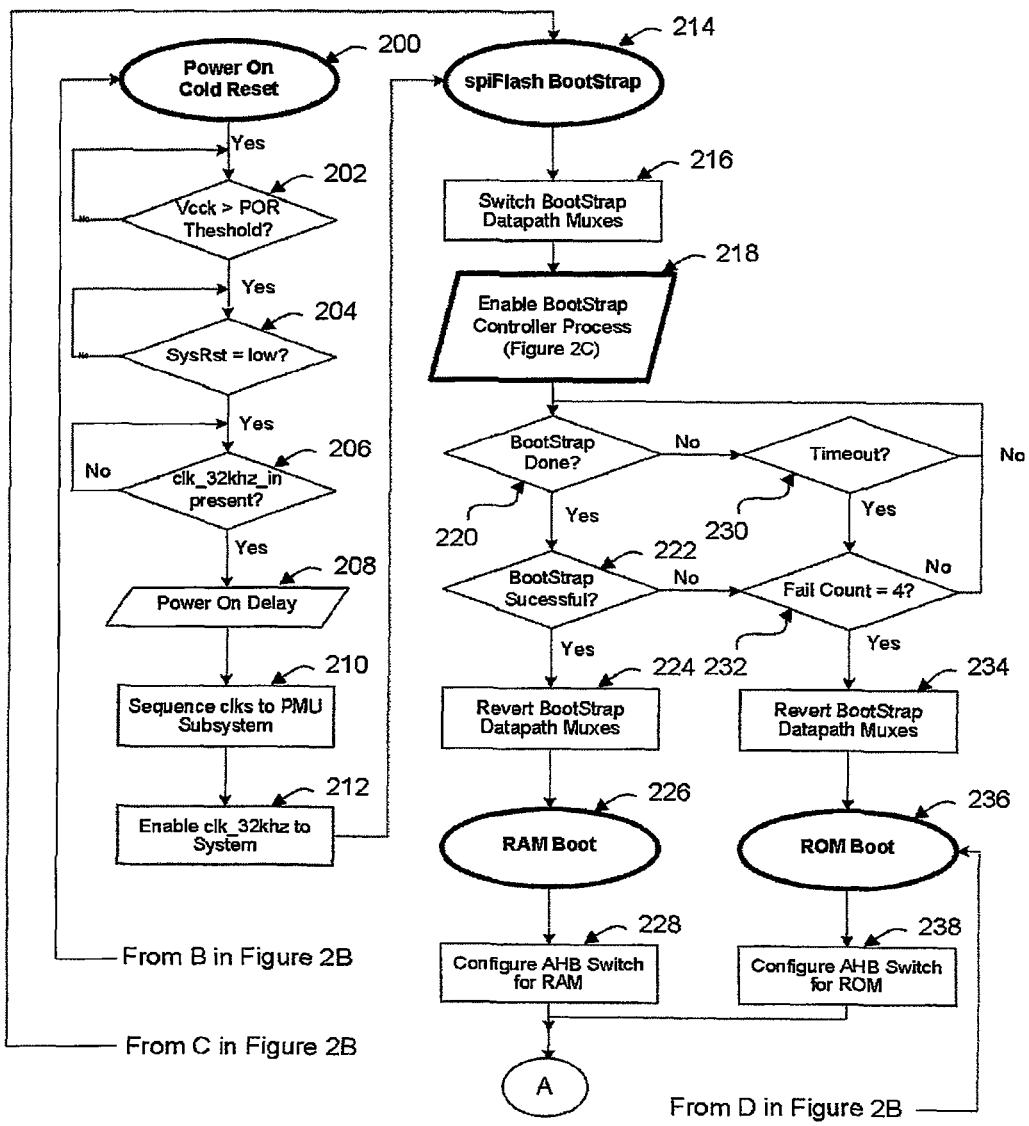
FIG. 2A is a flowchart showing steps for performing a power-on cold restart of the SoC device of FIG. 1 from SPI flash memory or from boot ROM, according to an exemplary embodiment.

Turning now to FIG. 2A, on power up (step 200), the PMU 100 brings itself out of reset based on predetermined external conditions, namely: an indication from POR 125 that system voltages are within required ranges (step 202) and that any external reset key press has been released (step 204), and the presence of a 32 Khz clock signal from external RTC 145 for clocking in the RST OUT signal to the PMU 100 (step 206).

The PMU 100 then controls the initial download of boot code from SPI flash 130 to RAM 135. More particularly, the PMU 100 enables SPI controller 150 and controls multiplexers 160 and 162 to load boot code from SPI flash 130 into RAM 135 via a boot strap controller 165. SPI controller 150 can cycle up to four times before the code transfer fails, as discussed in greater detail below.

After a delay (step 208) to ensure recognition by the PMU 100 of the reset trigger conditions, the system clock signals are sequenced to the PMU 100 (step 210), as discussed in greater detail below with reference to FIG. 3.

At step 212, the 32 Khz clock signal from RTC 146 is enabled to the rest of the SoC device (i.e. outside of the PMU 100).

From power-on cold reset, the PMU 100 enters a SPI flash bootstrap sequence (step 214), starting with switching multiplexers 160 and 162 to select bootstrap module 165 (step 216). The PMU 100 then enables a bootstrap control process for reading boot code stored in SPI flash memory 130 (typically 4K) and writing it to RAM 135, as discussed in greater detail below with reference to FIG. 2C.

While the bootstrap controller process is running (FIG. 2C), a timeout sequence runs in parallel (steps 220, 222, 230 and 232) such that if the bootstrap controller process is not successfully completed within a predetermined timeout period, PMU 100 will reset and restart the bootstrap controller. If the bootstrap controller process fails or times out four times, PMU 100 will abort the bootstrap operation and prepares for booting the system controller 105 (step 236) from BROM (170), as discussed in greater detail below.

Once the bootstrap controller process is complete (a YES at step 220) and is successful (a YES at step 222), there is sufficient code in RAM 135 to boot the CPU 114 of system controller 105 to download the remainder of the required operating code from external main storage μSD memory 140. PMU 100 then reverts the bootstrap datapath muxes 160 and 162 to reconnect the SPI Controller 150 to the APB bus 107 and the RAM 135 to the multiplexer 172, respectively (step 224).

Figure 2B:
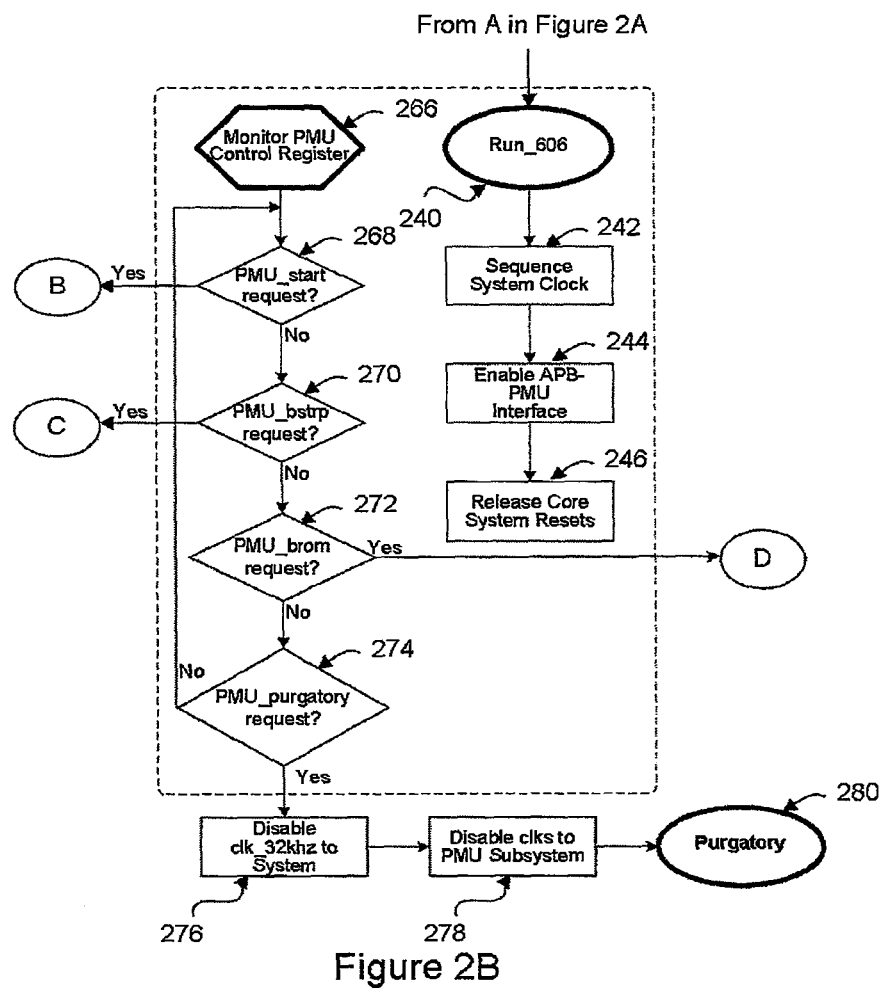
FIG. 2B is a flowchart showing steps of a software programmable hardware reset, including steps for finalizing the power-on cold restart of the SoC device of FIG. 1, and steps for initiating power state changes in response to software requests from the SoC system controller, according to an exemplary embodiment.

If the bootstrap controller process is successful, multiplexer 172 then is configured for the RAM 135 datapath (step 228), otherwise BROM 170 datapath is configured (step 238), and the PMU enters the system controller 105 'run' state (FIG. 2B). Upon entry to this state (step 240) the system clock enables are sequenced (step 242), an interface is established for connecting the PMU 100 to the APB (step 244) and core system resets are released (step 246), thereby completing preparation for the system controller to boot or execute code. Once the APB-PMU interface is enabled, the Monitor PMU Control Register process becomes active (step 266), for monitoring register 116, as discussed in greater detail below.

If the RAM 135 boot is configured, the system controller 105 then loads the remainder of the operating code to IRAM 115 from the external main storage μSD memory 140 under control of a RAM boot sequence 226 executing the code in RAM 135. More particularly, system controller 105 first reads initial code from μSD memory 140 for performing a post-power-on self test whereby it communicates with the host processor 166 via GPMC-APB bridge 168 using JTAG (Joint Test Action Group, defined by the IEEE 1149.1 Standard Test Access Port and Boundary-Scan Architecture) for validating the GPMC interface before finishing the boot process. The initial code then gets flushed from RAM 135 and a second set of code (i.e. normal CPU operating code) is read from μSD memory 140. Since the host processor 166 is unable to communicate directly from μSD memory 140, the system controller 105 powers up the host processor 166 by feeding code from μSD memory 140 to the host processor 166 via RAM 135 (i.e. by using GPMC-APB bridge 168 to emulate a NAND flash whereby the host processor 166 looks for data at a particular RAM address, and data is sequentially fed to that address until the GPMC-APB bridge 168 is able switch to synchronous mode whereupon the host processor 166 continues to boot from μSD memory 140).

Figure 2C:
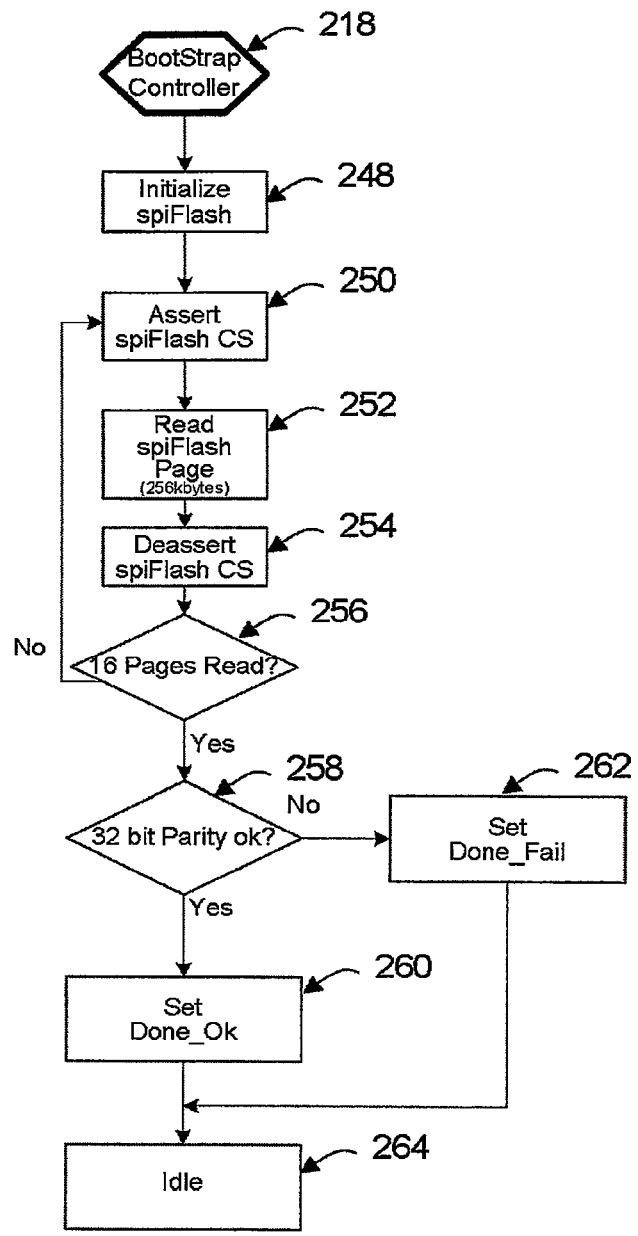
FIG. 2C is a flowchart showing steps of a bootstrap controller process, according to an exemplary embodiment.

However, if the bootstrap controller process of FIG. 2C fails at step 232 (e.g. SPI flash memory 130 is empty), PMU 100 executes a ROM boot sequence 236 for booting the system controller 105 from boot ROM 170. Boot ROM 170 contains only enough code for the system controller 105 to communicate with UART 180 for writing the boot code to SPI flash memory 130 from an external source, such as a PC 190.

Thus, the ROM boot sequence 236 functions as a backup bootstrap sequence whereas the RAM boot sequence 226 functions as a default bootstrap sequence.

Once SPI flash memory 130 has been loaded with code supplied from PC 190 via UART 180, the system controller 105 then continues to load further code into the external main storage μSD memory 140.

Turning to FIG. 2C, the bootstrap controller process (step 218) is shown in greater detail. First, the SPI flash memory 130 is initialized (step 248), the SPI flash memory chip select is asserted (step 250), data is read form the SPI flash memory to RAM 135 in 256 Kbyte pages (step 252) and the chip select is de-asserted (step 256). If the full 4K bytes have not yet been written to RAM 135 (i.e. a NO at step 256), then steps 250-254 are repeated. Once the full 4K bytes have been written to RAM 135 (i.e. a YES at step 256), PMU 100 performs a 32-bit parity check of the contents of RAM 135 (step 258) to determine if the boot code in RAM 135 is valid>if the parity check passes, the PMU sets a "Done_OK" flag (step 260) and goes into an idle mode (step 264), following which step 220 is executed, as discussed above in connection with FIG. 2A. If the 32-bit parity check of RAM 135 fails (i.e. a NO at step 258), then a "Done_FAIL" flag is set (step 262), which is detected as by the PMU 100 at step 222 (i.e. a NO decision).

As discussed above with reference to the power-on cold reset illustrated in FIG. 2A, the system clock signals are sequenced to the PMU 100 at step 210. In order to effect this sequencing, a further state machine is provided for sequencing clock signals from the system clocks 102 to the PMU 100 so that they do not occur within a single 32 KHz clock cycle.

Figure 3:
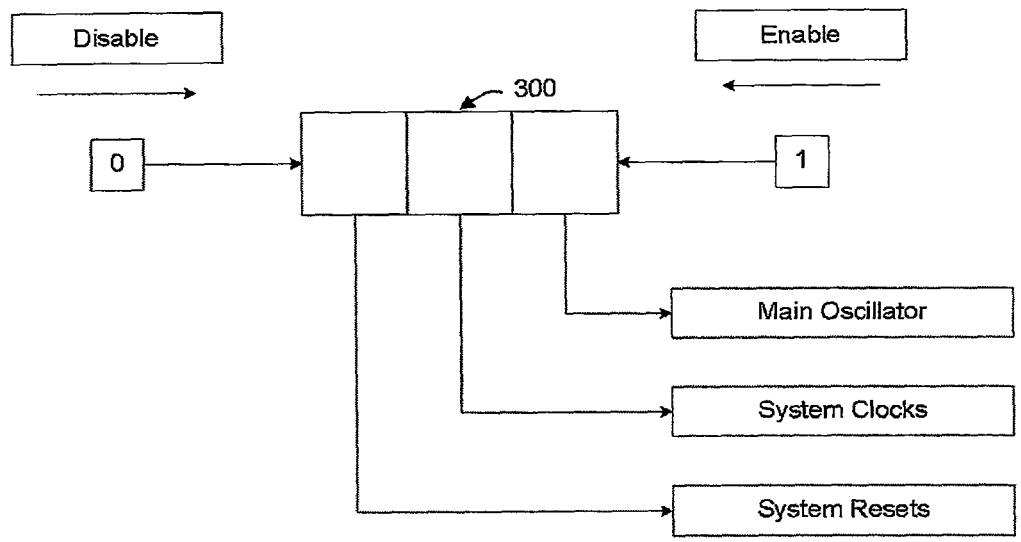
FIG. 3 is a block diagram of a system clock sequencer, according to an exemplary embodiment.

This state machine is represented by a 3-bit shift register 300, as shown in FIG. 3. During power-on cold reset 200, the shift register 300 is loaded with successive "1" values in step 210 for first enabling the main system oscillator to the ASIC (not shown), followed by the system clocks 102, and then system resets to various SoC components. On the other hand, when the system is entering purgatory, the shift register 300 is loaded with successive "0" values in step 278 for first disabling the system resets, followed by disabling the system clocks 102, and finally disabling the main system oscillator to the ASIC.

Returning to FIG. 2B, once the system controller 105 has booted, the PMU 100 can be addressed via the APB in order for the system controller 105 to request changes in power states that typically would not be entered without some type of external trigger event. Specifically, the system controller 105 monitors a control register (pmu_ctrl_reg) of the PMU 100 to detect specific instructions for causing the PMU 100 to jump to specific reset states.

In order to protect against software instructions inadvertently causing a request for a power state change, the request is required to conform to one of a limited set of instructions that are written to the PMU control register. If any other values are written to this register, the write operations are ignored.

For example, the PMU control register (pmu_ctrl_reg) can be configured at a specific physical address and the PMU state request (PMU_ST_REQ) can be of the form set forth in the following table:

| | Reserved-Data written is not used |
|---|---|
| 0x0000 a871: | pmu_start-Cold boot including voltage ramp & clock initialization delays. |
| 0x0000 b452: | pmu_bstrp-Boot from spiFlash |
| 0x0000 c233: | pmu_brom-Boot from internal ROM |
| 0x0000 d114: | pmu_purgatory-Enable resets, disable system clocks & enter deep power down. External keyboard reset required to wake. |

Thus, if at step 268 the PMU 100 detects a PMU_start request, the power-on cold reset sequence 200 is initiated. If at step 270 the PMU 100 detects a PMU_bstrp request, the SPI flash bootstrap sequence 214 is initiated. If at step 272 the PMU 100 detects a PMU_brom request, the ROM boot sequence 236 is initiated. If at step 274 the PMU 100 detects a PMU_purgatory request, the 32 Khz system clock is disabled (step 276), system clocks 102 are disabled from the PMU 100 and a purgatory sequence 280 is initiated wherein the SoC device enters a deep power-down state but with sufficient power to maintain the RTC time stamp.

As discussed above, software control of the PMU 100 as set forth above provides flexibility when debugging and testing SoC devices because there is no need to alter external board states. Also, providing programmable changes in reset states as an alternative to full system reset preserves state data so that the system can be restarted efficiently and quickly from known conditions.

It is contemplated that the number of power states that can be controlled can be expended beyond the four states set forth above. For example, it is contemplated that the PMU 100 can cause the SoC device to enter a 'semi-purgatory' low-power state from which the system can recover without a system reset (i.e. where the 32 Khz continues running, PMU switches to low speed clocks, and low-level interrupts are enabled). Also, the PMU 100 can be used to control certain system run-time behaviour in order to respond quickly to power-fail detection (e.g. the PMU can include a watchdog timer). Additionally, where more than one power island is provided on the device, software control of the PMU 100 can effect reset sequencing to the various power islands.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of controlling reset states in a System-On-a-Chip (SoC) device, comprising:
   receiving a first software request for controlling the reset states from a system controller within the System-On-a-Chip (SoC) device, the first software request conforming to one of a plurality of predefined values;
   switching to one of a plurality of predefined reset states corresponding to a respective one of said predefined values in response to the first software request and detection of a predetermined sequence of control register accesses configured to implement a requested reset state; and
   ignoring a second software request that does not conform to any of said plurality of predefined values.

2. The method of claim 1, wherein said one of said plurality of predefined reset states further comprises a state for initiating a power-on cold reset sequences for monitoring external reset conditions and in the event said conditions are satisfied then bootstrapping said device.

3. The method of claim 1, wherein said one of said plurality of predefined reset states further comprises a state for initiating a default bootstrap sequence for bootstrapping said device from a flash memory.

4. The method of claim 1, wherein said one of said plurality of predefined reset states further comprises a state for initiating a backup bootstrap sequence for bootstrapping said device from a read-only memory.

5. The method of claim 1, wherein said one of said plurality of predefined reset states further comprises a state for initiating a purgatory sequence for putting said device in a deep power-down state while maintaining real time clock signals.

6. The method of claim 2, wherein power-on cold reset sequence further comprises determining:
   whether device voltages are within predetermined ranges;
   whether any external reset key press has been released;
   the presence of a system clock signal; and
   when said device voltages, external key press release and presence of a system clock signal conditions are satisfied then sequencing control signals to said device and initiating a default bootstrap sequence for bootstrapping said device from a flash memory.

7. The method of claim 3, wherein said default bootstrap sequence further comprises:
   enabling a bootstrap controller process for downloading boot code from said flash memory to said device;
   validating said boot code downloaded from said flash memory; and
   when said boot code passes validation after a predetermined number of attempts within a predetermined time period then downloading remaining code from a host processor; or
   when said boot code fails to pass validation after said predetermined number of attempts within said predetermined time period then initiating a bootstrap sequence for bootstrapping said device from a read-only memory.

8. A system for controlling reset states in a System-On-a-Chip (SoC) device, comprising:
   a system controller;
   a communication bus; and
   a power management unit connected to said communication bus for receiving a first software request for controlling the reset states from said system controller and in the event said first request conforms to one of a plurality of predefined values then switching to one of a plurality of predefined reset states corresponding to a respective one of said predefined values in response to the first software request and detection of a predetermined sequence of control register accesses configured to implement a requested reset state, and in the event a second software request does not conform to any of said plurality of predefined values then ignoring said second software request.

9. The system of claim 8, further comprising a power-on reset device for monitoring external reset conditions and in the event said conditions are satisfied providing a reset signal to said power management unit for bootstrapping said system controller.

10. The system of claim 9, wherein said external reset conditions further comprise voltages within predetermined ranges, release of external reset keys, and the presence of a system clock signal; and wherein said power management unit sequences control signals to said device responsive to said conditions being satisfied.

11. The system of claim 10, further comprising a random access memory (RAM) connected to said system controller, an external flash memory containing boot code, an external micro secure digital (μSD) memory containing additional code, and a bootstrap controller for loading said boot code from said flash memory to said RAM for bootstrapping said system controller in response to which said system downloads said additional code from said external μSD memory.

12. The system of claim 11, further comprising a boot read only memory (ROM) connected to said system controller containing sufficient code for bootstrapping said system controller in the event of a failure to load said boot code from said flash memory to said RAM.

13. The system of claim 12, further comprising a first multiplexer under control of said power management unit for connecting one of either said RAM or said boot ROM to said system controller.

14. The system of claim 13, further comprising a further multiplexer under control of said power management unit for connecting one of either said boot strap controller or said communication to said flash memory.

15. The system of claim 10, further comprising a shift register for sequentially enabling said control signals on successive clock cycles of said system clock signal.

* * * * *